United States Patent

Krynitz et al.

[11] Patent Number: 5,718,844
[45] Date of Patent: Feb. 17, 1998

[54] COBALT/COBALT OXIDE POWDER

[75] Inventors: Ulrich Krynitz, Goslar; Dirk Naumann; Bernd Mende, both of Bad Harzburg; Armin Olbrich, Seesen; Gerhard Gille, Goslar, all of Germany

[73] Assignee: H.C. Starck GmbH & Co., KG, Goslar, Germany

[21] Appl. No.: 529,953

[22] Filed: Sep. 18, 1995

Related U.S. Application Data

[63] Continuation of Ser. No. 279,948, Jul. 25, 1994, abandoned.

[30] Foreign Application Priority Data

Aug. 12, 1993 [DE] Germany .............. 43 27 023.9

[51] Int. Cl.$^6$ .................. H01M 4/52; C01G 51/04
[52] U.S. Cl. .................. 252/513; 252/519; 252/182.1; 429/223
[58] Field of Search .................. 252/513, 519, 252/182.1; 429/223, 218; 445/646

[56] References Cited

U.S. PATENT DOCUMENTS

| | | | |
|---|---|---|---|
| 4,072,501 | 2/1978 | Quinby | 423/11 R X |
| 4,629,500 | 12/1986 | Janz et al. | 75/5 BA |
| 4,781,580 | 11/1988 | Janz et al. | 432/107 |
| 5,032,475 | 7/1991 | Hasebe et al. | 429/60 |
| 5,053,292 | 10/1991 | Hasebe et al. | 429/101 |
| 5,571,636 | 11/1996 | Ohta et al. | 429/218 |
| 5,629,111 | 5/1997 | Yamawaki et al. | 429/223 |

FOREIGN PATENT DOCUMENTS

| | | | |
|---|---|---|---|
| 0135078 | 3/1985 | European Pat. Off. | F27B 7/08 |
| 353837 | 2/1990 | European Pat. Off. | |
| 0419220 | 3/1991 | European Pat. Off. | H01M 10/34 |
| 523284 | 1/1993 | European Pat. Off. | |
| 581275 | 2/1994 | European Pat. Off. | |
| 2144850 | 6/1990 | Japan | |
| 2234357 | 9/1990 | Japan | |
| 3078966 | 4/1991 | Japan | |

OTHER PUBLICATIONS

Görts, P.C., et al., "Oxidation of the Co(1010) Surface", *Surface Science*, 287/288, Part A ( 10 May 1993), 255–259.
Chemical Abstracts, CA 119:258313, Huang, Keqin, et al., *Solid State Ionics*, 61 (4) (1993), 355–9.
Chemical Abstracts, CA 119:148472, Roh, Kwon Sun, et al., *J. Korean Chem. Soc.*, 37 (7) (1993), 635–41.
Gangopadhyay, S., et al.,*IEEE Transactions on Magnetics*, 28 (5) (1992), 3174–6.
Ramasesha, S.K., et al., *Journal of Applied Electrochemistry*, 19 (3) (May 1989), 394–400.
Chemical Abstracts, CA 73:94036, Fischer, Wilhelm Anton, et al., *Arch. Eisenhuettenw.*, 41 (7) (1970), 661–73.
Patent Abstracts of Japan, vol. 14, No. 55 (E–882) (3998) 31 Jan. 90.
Chemical Abstracts, vol. 114, No. 6, 11 Feb. 91.
Gmelin, Co, Erganzungsband 58, pp. 470–79 (mo. & year not known).
Gmelin, Co, Erganzungsband (Supplement) 58, pp. 470–479.

*Primary Examiner*—Douglas J. McGinty
*Attorney, Agent, or Firm*—Jerry Cohen

[57] ABSTRACT

Cobalt/cobalt oxide powder having the composition $Co_x(CoO)_{1-x}$, where x is from 0.02 to 5, and a process for its production and use in nickel hydroxide electrodes for secondary batteries to enhance capacity.

8 Claims, 1 Drawing Sheet

COBALT/COBALT OXIDE POWDER

This is a continuation of application Ser. No. 08/279,948, filed Jul. 25, 1994 now abandoned.

This invention relates to a new cobalt/cobalt oxide powder having the composition $Co_x(CoO)_{1-x}$, to a process for its production and to its use.

BACKGROUND OF THE INVENTION

The principal electrochemically active constituents of nickel electrodes for nickel/cadmium or nickel/metal hydride secondary batteries are nickel hydroxide and—as additives thereto—such cobalt materials as, for example, cobalt metal powder, cobalt(II) oxide and/or cobalt(II) hydroxide. These constituents are processed together with other auxiliary components to form pastes which are then incorporated in an electrically conductive electrode support. The electrodes thus obtained are subjected to further processing steps, such as drying and/or sintering, to find electrode forms for batteries differing in their design.

For the production of button cells in particular, the electrochemically active electrode constituents are pressed together with auxiliary components, such as graphite or nickel powder for example, to form tablets differing in size. The cobalt component is typically used in the form of a mixture of cobalt metal powder and cobalt(II) oxide or cobalt(II) hydroxide.

The cobalt materials, which are generally present in the electrode material in a concentration of 2 to 10% by weight, perform various functions.

Thus, it is postulated in European Patent Application 353 837 that, in the formulation of the electrode, i.e. in the initial charging of the battery, the cobalt metal is first oxidized in accordance with its potential to form divalent cobalt which is soluble in the alkaline electrolyte. $Co^{2+}$ ions from the cobalt metal and any $Co^{2+}$ ions already present from the monooxide or hydroxide diffuse towards the surface of the nickel hydroxide. As the charging of the battery continues, they are oxidized to $Co^{+3}$ ions in the form of $CoO(OH)$ which is deposited as a layer onto the surface of the nickel hydroxide particles. This layer establishes the necessary electrical conductivity of the electrode material in the subsequent charging and discharging cycles of the battery. In addition, the $Co^{2+}$ ion can migrate into the lattice of the nickel hydroxide layer where it modifies the electrochemical properties of the nickel hydroxide layer in such a way that the electrode material assumes a higher charging efficiency. In addition, the cobalt component acts as a safety reserve in the event of excessive discharging in that the $Co^{2+}$ ion is electrochemically reduced and the elimination of hydrogen is prevented.

Suitable cobalt compounds are disclosed in U.S. Pat. No. 5,032,475 and U.S. Pat. No. 5,053,292 and in European Patent Application 523,284.

In the electrochemical oxidation process, the cobalt metal powder is made available for the charging and discharging processes in the electrode to a level of only 50% because a considerable proportion of the metal becomes coated with a firmly adhering oxide layer and more cobalt in the form of $Co^{2+}$ ions is prevented from diffusing into the electrolyte. Finally, approximately 50% of the cobalt metal is converted into insoluble compact cobalt oxides. Hitherto, this problem has been overcome by the addition of partly soluble cobalt compounds, such as cobalt hydroxide or cobalt monoxide, to the electrode material. Even before the electrochemical forming process, the partly dissolved $Co^{2+}$ ion disperses in the electrolyte and is deposited in the required form on the surface of the nickel hydroxide (Matsumo et al.: The 162nd ECS Fall Meeting Detroit, 18 (1982)).

The cobalt(II) oxide hitherto used for the described applications is industrially produced by thermal decomposition of cobalt carbonate, cobalt hydroxide or higher cobalt oxides. Unfortunately, this gives rise to the formation of cobalt oxides which—in accordance with the thermodynamic equilibrium—contain an excess of oxygen (see Gmelin, Co, Ergänzungsband (Supplement) 58, pages 470–479). The oxygen excess decreases with increasing calcination temperature.

Traces of $Co^{3+}$ in the cobalt(II) oxide accelerate the further oxidation of the divalent cobalt under the effect of atmospheric oxygen and atmospheric moisture. Because of its insolubility in the electrolyte, the trivalent cobalt formed is not available as an active component of the electrode material in the battery and, accordingly, eliminates the effectiveness of the cobalt compounds used for the electrochemical process.

The cobalt hydroxide often used shows poorer solubility in the electrolyte than cobalt(II) oxide and is also highly sensitive to further oxidation by atmospheric oxygen, particularly under the influence of atmospheric moisture. The effectiveness of the cobalt from cobalt (II) hydroxide in the electrode is lower than that of the cobalt from cobalt(II) oxide.

Accordingly, the problem addressed by the present invention is to provide a cobalt material as an active component in the electrode material for secondary cells of nickel hydroxide which do not have any of the disadvantages of the prior art and which is more effective and more useful than the hitherto known mixtures of cobalt metal powder and cobalt(II) oxide.

SUMMARY OF THE INVENTION

It has now been found that these requirements are satisfied by a cobalt/cobalt oxide powder having the composition $Co_x(CoO)_{1-x}$, where x=preferably 0.02 to 0.5, and an average particle size of less than 20 µm. The cobalt/cobalt oxide powder according to the invention is a solid dark brown powder in which the cobalt(II) oxide and cobalt metal are homogeneously distributed in the form of extremely fine particles. The cobalt/cobalt oxide powder according to the invention is free from $Co^{3+}$. The presence of the cobalt metal protects the cobalt/cobalt oxide powder according to the invention against unwanted oxidation to trivalent cobalt oxides.

According to the invention, the average particle size of the primary particles of the cobalt/cobalt oxide powder should be selected in dependence upon the particle size of the nickel hydroxide in the battery. In general, it should be smaller than that of the nickel hydroxide because highly uniform mixtures can be obtained in this way. In addition, a small particle size and large BET surface of the cobalt/cobalt oxide provide for easier and more rapid solubility in the electrolyte. The average particle size of the primary particles is preferably in the range from 0.5 to 10 µm.

As mentioned at the beginning, conventional electrode mixtures contain mixtures of cobalt metal powder and cobalt(II) oxide in addition to nickel hydroxide. If the cobalt(II) oxide is replaced by equal amounts of the cobalt/cobalt oxide powder as taught herein, it is possible to obtain at least 10% higher effectiveness of the cobalt used for the electrochemical charging and discharging processes in the battery.

By increasing the percentage content of cobalt metal in the cobalt/cobalt oxide powder, the percentage content of cobalt metal powder in the electrode can be further reduced, enabling the cobalt used in the electrode material to be saved. The choice of the cobalt metal content is critically determined by the type of battery and the applications envisaged.

Cobalt/cobalt oxide powders having the composition $Co_x$ $(CoO)_{1-x}$, where x has a value of 0.02 to 0.2, are particularly suitable.

The present invention also relates to a process for the production of the cobalt/cobalt oxide powders according to the invention, in which cobalt oxide and/or cobalt compounds which form cobalt oxides on thermal decomposition are reduced at temperatures of 500° to 850° C. under conditions leading to the formation of the cobalt/cobalt oxide powders. CoO, $Co_2O_3$ and/or $Co_3O_4$ are advantageously used as the cobalt oxides while hydroxides, oxalates and/or carbonates are used as the cobalt compounds forming cobalt oxides. Suitable reducing agents are, in particular, carbon monoxide, hydrogen, carbon, natural gas and/or hydrocarbons.

The reaction is advantageously carried out continuously in rotary kilns or fluidized beds at temperatures of, preferably, 580° to 650° C. The particle size distribution can be varied over a broad range through the choice of the calcination conditions and the reaction parameters. Particularly homogeneous cobalt/cobalt oxide powders can be obtained in a spiral rotary kiln of the kind disclosed in European Patent Application 135 078.

The present invention also relates to the use of the cobalt/cobalt oxide powders according to the invention as a constituent of electrode materials for secondary batteries.

DETAILED DESCRIPTION OF PREFERRED EMBODIMENTS

Figure 1:
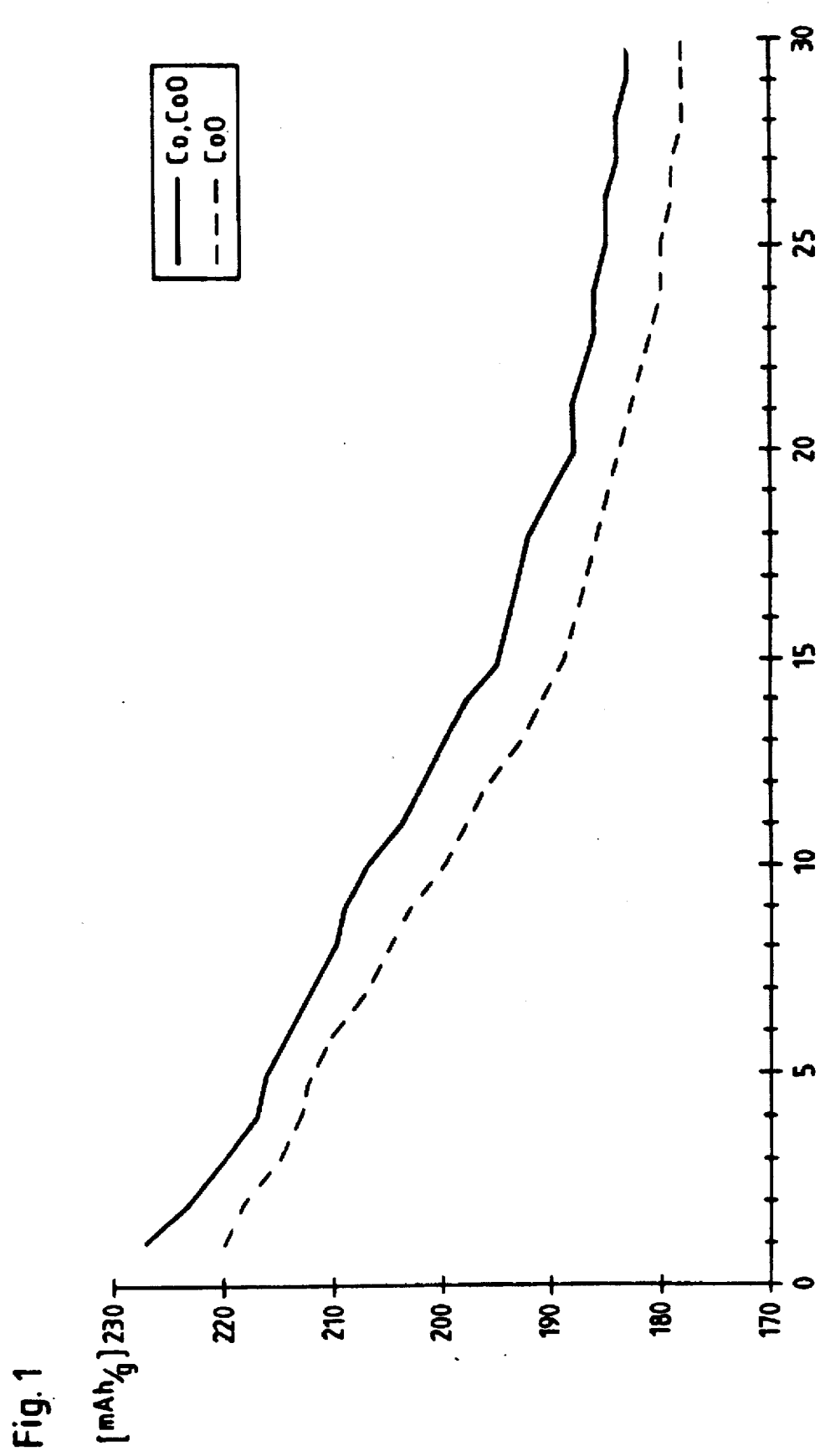

The following Examples are intended to illustrate the invention without limiting it in any way.

EXAMPLES 1 to 13

Production of cobalt/cobalt oxide in a rotating tube furnace

Various cobalt/cobalt oxides produced in the following rotating tube furnace are listed in Table 1 along with their physical and chemical properties and the production conditions:

| Length of the heating zone: | 1600 mm |
|---|---|
| Cooling zone (cooling water): | 1000 mm |
| Electrical heating capacity: | 36 kW |
| Rotational speed: | 1.5–7.5 r.p.m., infinitely variable |
| Inclination of the rotating tube: | up to 8° |
| Tube diameter: | 154 mm |
| Material of the rotating tube: | chrome-molybdenum steel |

TABLE 1

| Ex. | CO-content [%] | Temperature [°C.] | Nitrogen [m³/h] | Hydrogen [m³/h] | Throughput [kg/h] | Residence time [mins.] | Laser diffraction ($D_{50}$-μm) | BET* [m²/g] | Apparent density [g/cm³] |
|---|---|---|---|---|---|---|---|---|---|
| 1. | 80.44 | 800 | 9 | 120 | 0.96 | 35 | 37.0 | 0.8 | 1.47 |
| 2. | 79.94 | 800 | 9 | 120 | 2 | 30 | 27.0 | 0.8 | 1.30 |
| 3. | 79.6 | 600 | 5 | 192 | 2.4 | 25 | 1.1 | 7.5 | 0.81 |
| 4. | 79.94 | 650 | 5 | 192 | 1.7 | 25 | 2.4 | 3.9 | 1.02 |
| 5. | 80 | 700 | 5 | 192 | 1.96 | 25 | 2.8 | 2.2 | 1.17 |
| 6. | 79.4 | 750 | 5 | 192 | 1.98 | 25 | 2.9 | 1.7 | 1.28 |
| 7. | 80.3 | 600 | 5 | 192 | 1.91 | 25 | 3.2 | 9.9 | 0.72 |
| 8. | 78.7 | 620 | 5 | 192 | 1.91 | 25 | 3.2 | 11.7 | 0.71 |
| 9. | 81.3 | 640 | 5 | 192 | 1.91 | 25 | 3.5 | 7.6 | 0.75 |
| 10. | 81.4 | 600 | 5 | 400 | 2.06 | 25 | 3.3 | 12.6 | 0.75 |
| 11. | 78.6 | 600 | 5 | 120 | 2.02 | 25 | 3.1 | 9.9 | 0.72 |
| 12 | 79.7 | 600 | 5 | 192 | 1.1 | 25 | 3.5 | 11.6 | 0.78 |
| 13 | 80.5 | 580 | 5 | 192 | 1.9 | 25 | 3.2 | 11.7 | 0.71 |

*As determined by the nitrogen 1-point method (DIN 66131)

EXAMPLE 14

Comparison of electrodes containing cobalt monoxide (comparison) and a cobalt/cobalt oxide (according to the invention)

A nickel hydroxide electrode in tablet form was produced as follows:

TABLE 2

| Hydroxide | Co/CoO | $Co/Co_{0.05}(CoO)_{0.95}$ |
|---|---|---|
| Nickel hydride, regular BET 61 m²/g, doped with 1% $Co(OH)_2$ | 100 g | 100 g |
| Cobalt metal powder, FSSS 1.5 μm | 2 g | 2 g |
| Cobalt monoxide, FSSS 1.5 μm | 4 g | |
| $Co_{0.05}(CoO)_{0.95}$ FSSS 1.5 μm from Example 12 | | 3.9 g |
| Graphite | 40 g | 40 g |

The percentage content of the cobalt monoxide or cobalt/cobalt oxide is gauged in such a way that the same quantity of cobalt is present in the electrode. 30 charging and discharging cycles with ⅕ of the capacity is charged/discharged per hour ⅕ C were measured with these electrodes. The capacity of the nickel hydroxide electrode of Example 14 is plotted against the number of cycles in FIG. 1.

For the same quantity of cobalt in the form of cobalt metal powder and cobalt monoxide or cobalt/cobalt oxide, a higher capacity and hence higher utilization of the battery electrode are obtained in the case of cobalt/cobalt oxide.

We claim:

1. A powder having the homogeneous composition $Co_x(CoO)_{1-x}$ wherein x is in the range of 0.02 to 0.5 and the average particle size of the primary particles is less than 20 µm, the powder being free of Co3+.

2. The powder having the homogeneous composition $Co_x(CoO)_{1-x}$ as claimed in claim 1, characterized in that the average particle size of the primary particles is 0.5 to 10 µm.

3. The powder having the homogeneous composition $Co_x(CoO)_{1-x}$ as claimed in claim 1 or 2, characterized in that x is in the range of 0.02 to 0.2.

4. A positive electrode suitable for use in a secondary battery comprising cobalt/cobalt oxide powders claimed in claims 1, 2, or 3.

5. The powder having the homogeneous composition $Co_x(CoO)_{1-x}$ as claimed in any one of claims 1, 2 or 3 as made by the process of thermally decomposing a precursor at 500°–850° C. and simultaneously exposing the thermally decomposed products to a reducing agent, the precursor being selected from the group consisting of CoO, $Co_2O_3$, $Co_3O_4$ and cobalt oxide sources, the latter selected from the group consisting of cobalt hydroxides, oxalates and carbonates.

6. A powder material suitable for use as an electrochemically active comstituent of a nickel (nickel hydroxide) electrode of a nickel/cadmium or nickel/metal hydride secondary battery:

(a) as made by reduction of a precursor at 500°–850° C., (b) having a composition $Co_x(CoO)_{1-x}$ wherein x is in the range of 0.02 to 0.5, and being free of $Co^{3+}$, and (c) having an average primary particle size of less than 20 microns and the form of a solid dark brown powder with Co(II) oxide and cobalt metal homogeneously distributed therein.

7. The powder material of claim 6 wherein x is in the range of 0.02 to 0.2 and the average primary particle size of said powder material is 0.5 to 10 microns.

8. A nickel hydroxide electrode comprising said powder material of either claim 6 or claim 7, and powder particles of nickel hydroxide, wherein said powder material has an average primary particle size smaller than that of said powder particles of nickel hydroxide.

* * * * *